ic Office 3,324,173
Patented June 6, 1967

3,324,173
(2-METHYLENEALKANOYL)BENZOIC ACIDS
John B. Bicking, Lansdale, Pa., assignor to Merck & Co.,
Inc., Rahway, N.J., a corporation of New Jersey
No Drawing. Filed Nov. 16, 1964, Ser. No. 411,556
7 Claims. (Cl. 260—515)

This invention relates to a new class of chemical compounds which can be described generally as (2-methylenealkanoyl)benzoic acids and to a novel method for their preparation.

In pharmacological studies the products of this invention show an ability to effect an elimination of excess fluid and electrolyte from the body. Thus, when administered in therapeutic dosages in conventional vehicles, the instant products effectively reduce the concentration of sodium and chloride ions in the body and lower dangerous excesses of body fluids to acceptable levels. The (2-methylenealkanoyl)benzoic acids, therefore, are highly useful in the treatment of hypertension, congestive heart failure, kidney malfunctioning, cirrhosis of the liver and other diseases associated with edema.

The products of the invention are compounds having the following structural formula:

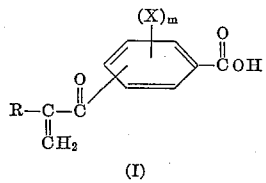

(I)

wherein R is lower alkyl; X is a member selected from the group consisting of hydrogen, halogen, lower alkyl and, taken together, two X radicals on adjacent carbon atoms of the benzene ring may be joined to form an hydrocarbylene chain (i.e., a divalent organic radical composed solely of carbon and hydrogen) containing four carbon atoms between their points of attachment, for example, tetramethylene, 1,3-butadienylene (i.e., —CH=CH—CH=CH—), etc.;

and $m$ is an integer having a value of 1–2; and the non-toxic, pharmacologically acceptable acid addition salts of the said acids, prepared by treating the acid with a base having a non-toxic, pharmacologically acceptable cation. In general, any base which will form an acid addition salt with the foregoing (2-methylenealkanoyl)benzoic acids (I) and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc.

This invention also relates to the ester and amide derivatives of the instant (2-methylenealkanoyl)benzoic acids, which may be prepared by conventional means well-known to those skilled in the art; thus, for example, the said ester derivatives may be prepared by the reaction of the (2-methylenealkanoyl)benzoic acid products of the invention with an alcohol as, for example, with a lower alkanol to prepare the corresponding esterified derivative or, alternatively, the benzoic acid derivative may be converted to its acid halide by conventional means and then treated with the appropriate lower ankanol. Similarly, the amide derivatives of the instant (2-methylenealkanoyl)benzoic acids may be prepared by treating an acid halide derivative of the benzoic acids of the invention with ammonia or an appropriate amine to produce the corresponding amide. Another process for preparing the said amide derivatives comprises the conversion of the (2-methylenealkanoyl)benzoic acids of the invention to their corresponding esters and treating the said esters with ammonia or an appropriate amine to produce the corresponding amide. These and other equivalent methods for the preparation of the ester and amide derivatives of the instant benzoic acid products will be apparent to those having ordinary skill in the art and to the extent that the said derivatives are both non-toxic and physiologically acceptable to the body system, the said esters and amides are the functional equivalent of the corresponding (2-methylenealkanoyl)benzoic acid products.

A preferred embodiment of the invention relates to the 4-(2-methylenealkanoyl)benzoic acids having the following structural formula:

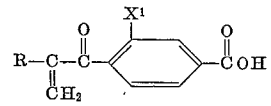

wherein R is lower alkyl and $X^1$ is a member selected from the group consisting of hydrogen and halogen. The above class of compounds exhibits particularly good diuretic and saluretic activity and thus represents a preferred subgroup of compounds within the scope of this invention.

The (2-methylenealkanoyl)benzoic acids of the invention are conveniently prepared from the corresponding alkanoyl substituted benzoic acid derivatives by treating the said acids with an aldehyde and the acid addition salt of a secondary amine, followed by decomposition of the Mannich amine salt thus formed to the desired product. Thus, according to this method of preparation, an alkanoyl substituted benzoic acid, illustrated by planar Formula II, infra, is first reacted with formaldehyde or paraformaldehyde and the acid addition salt of a di-lower alkylamine, piperidine or morpholine and the Mannich amine salt (III) thus formed is then converted directly to the corresponding (2-methylenealkanoyl)benzoic acid product (I) by decomposition as, for example, by heating the said Mannich salt at temperatures above room temperature in the presence of a solvent of high dielectric constant (e.g., dimethylformamide) or, alternatively, the salt of the Mannich amine (III) may be treated with a weak base, such as sodium bicarbonate, to obtain the corresponding free Mannich amine (IV) which is then decomposed to the desired (2-methylenealkanoyl)benzoic acid (I). Some of the Mannich amines (IV) decompose at ambient temperatures but generally decomposition is advantageously effected by slight heating. The following equations illustrate this process:

amine (IV) to the quaternary ammonium salt (V) intermediate and then to the desired product (I):

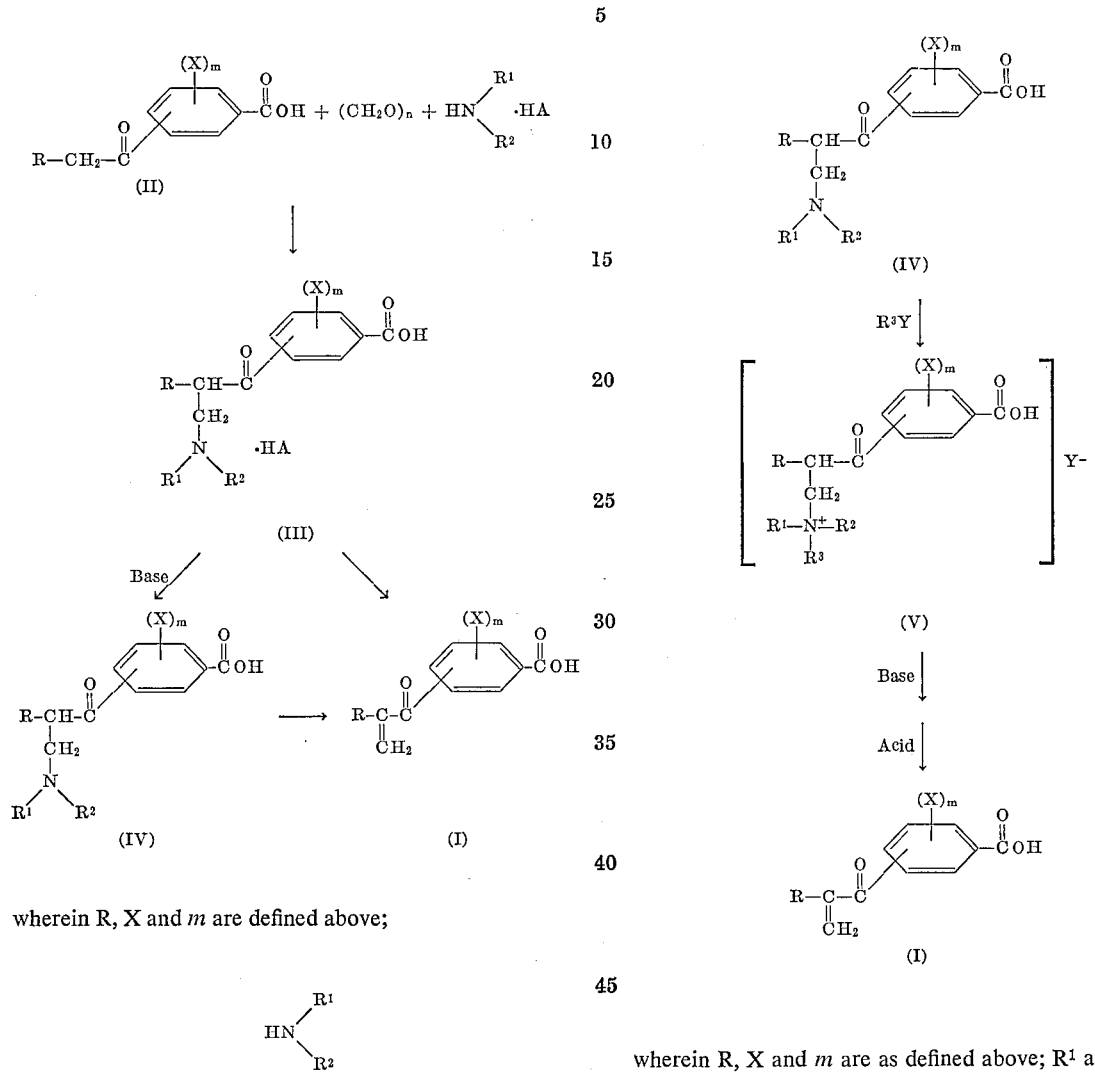

wherein R, X and *m* are defined above;

represents a secondary amine, for example, an amine selected from the group consisting of di-lower alkylamine, piperidine and morpholine; HA is the moiety derived from an organic or inorganic acid capable of forming salts with amines, for example, hydrochloric acid, etc.; and *n* is the integer 1 or a number greater than 1.

An alternate method for preparing the (2-methylenealkanoyl)benzoic acid products (I) of the invention also comprises treating an alkanoyl substituted benzoic acid (II) with formaldehyde or paraformaldehyde and the salt of a secondary amine but, unlike the foregoing method which converts the Mannich amine salt (III) thus formed to the corresponding free Mannich amine (IV) and then to the desired product (I), this alternating method consists in treating the Mannich amine (IV) with a suitable quaternizing agent to obtain the corresponding quaternary ammonium salt (V, infra) and then converting the said quaternary ammonium derivative to the desired (2-methylenealkanoyl)benzoic acid product (I) by treatment with a base, for example, an aqueous solution of sodium bicarbonate and then with a suitable acid. Suitable acids which may be used in the process include, for example, hydrochloric acid, etc. The following equation illustrates the method of converting the Mannich wherein R, X and *m* are as defined above; $R^1$ and $R^2$ each represents a member selected from the group consisting of lower alkyl and, taken together with the nitrogen atom to which they are attached, a mononuclear heterocyclic ring selected from the group consisting of piperidino and morpholino, $R^3Y$ represents an hydrocarbyl halide, i.e., the halide derivative of a monovalent organic radical composed solely of carbon and hydrogen, for example, methyl bromide, methyl iodide, etc., $R^3$ represents an hydrocarbyl radical, for example, lower alkyl, etc.; and $Y^-$ represents the anion derived from an hydrocarbyl halide, for example, a bromide ion, an iodine ion, etc.

The alkanoylbenzoic acids (II) employed as starting materials in the foregoing process are either known compounds or are conveniently prepared by methods which are well-known to those skilled in the art. Thus, for example, the said acids may be obtained by diazotizing an amino substituted alkanophenone (VI, infra) with sodium nitrite in an acidic medium, followed by neutralization of the reaction mixture thus obtained with a base and then treating the resulting mixture with an aqueous solution of cuprous cyanide; the nitrile intermediate thus formed is then hydrolyzed by conventional means as, for example, by the treatment thereof with a base such as an aqueous solution of sodium hydroxide, and then with an acid as, for example, with hydrochloric acid to produce the desired alkanoyl substituted benzoic acid derivative (II). The reaction is advantageously conducted at low temperatures as, for example, in the range of 0–10° C.:

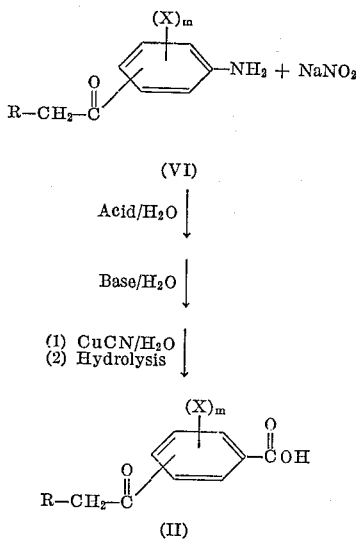

wherein R, X and m are as defined above. Suitable acids and bases which may be used in the above reaction include, for example, hydrochloric acid, sodium hydroxide, etc.

The amino substituted alkanophenones (VI) which are employed in the diazotization reaction may be obtained by a variety of methods, depending largely upon the position of the amino group on the nucleus of the phenone compound. The 4-aminoalkanophenones, for example, are advantageously prepared from the appropriate anilide derivative by the treatment thereof with an alkanoyl halide in the presence of aluminum chloride or other suitable metallic halide, and the 4-alkanol substituted anilide derivative thus formed is then hydrolyzed by conventional means to produce the desired product.

Those amino substituted alkanophenones (VI) wherein the amino group is at a position on the benzene ring other than the 4-position are conveniently prepared by treating an appropriate phenone, such as 2-chloropropiophenone, with fuming nitric acid at low temperatures in the range of 0–10° C. to produce the corresponding nitrophenone and then reducing the said nitro derivative thus obtained to the desired amine compound.

The (2-methylenealkanoyl)benzoic acids (I) of the invention are generally obtained as crystalline solids and, if desired, may be purified by recrystallization from a solvent. Suitable solvents include, for example, cyclohexane, benzene, aqueous isopropyl alcohol, etc.

The products of the invention are diuretic and saluretic agents and can be administered in therapeutic dosages in conventional vehicles as, for example, by oral administration in the form of a tablet as well as by intravenous injection. Also, the dosage of the products may be varied over a wide range as, for example, in the form of scored tablets containing 25, 50, 100, 150, 250 and 500 milligrams of the active ingredient for the symptomatic adjustment of the dosage to the patient to be treated. These dosages are well below the toxic or lethal dose of the products.

The examples which follow illustrate the (2-methylenealkanoyl)benzoic acids of the invention and the method by which they are prepared. However, the examples are illustrative only and it will be apparent to one having ordinary skill in the art that all of the products embraced by Formula I, supra, may also be prepared in an analogous manner by substituting the appropriate starting materials for those set forth in the examples.

EXAMPLES 1

*3-chloro-4-(2-methylenebutyryl)benzoic acid*

Step A: 2 - chloro - 4 - aminobutyrophenone.—Butyryl chloride (214 g., 2.0 mole) is added over a three-hour period to a stirred mixture of 170 g. (1.0 mole) of m-chloroacetanilide and 536 g. (4.0 mole) of aluminum chloride. The mixture is then heated on a steam bath for three hours, cooled and poured into a mixture of ice and concentrated hydrochloric acid. The organic layer is separated and heated and stirred with 1000 ml. of 6 N hydrochloric acid on a steam bath for two hours. The resulting solution is chilled to precipitate the hydrochloride salt of 2-chloro-4-aminobutyrophenone. The salt is stirred into a 20% solution of sodium hydroxide, and the free amine collected and recrystallized from aqueous isopropyl alcohol to obtain 62 g. of 2-chloro-4-aminobutyrophenone, M.P. 67–70° C.

Analysis for $C_{10}H_{12}ClNO$.—Calculated: C, 60.76; H, 6.12; N, 7.09; found: C, 60.79; H, 5.83; N, 6.99.

Step B: *3-chloro-4-butyrylbenzoic acid*.—2-chloro-4-aminobutyrophenone (29.7 g., 0.15 mole), in a mixture of 50 ml. of concentrated hydrochloric acid and 50 ml. of water, is diazotized at 0° C. with 11.0 g. (0.16 mole) of sodium nitrite. The solution is neutralized by careful addition of 20% sodium hydroxide solution at 0° C. and then added to an ice-cold solution of 0.4 mole of cuprous cyanide in 500 ml. of water. The resulting mixture is heated 0.5 hour on a steam bath. The organic layer is separated and stirred and heated on a steam bath with 300 ml. of 20% sodium hydroxide solution for 1.5 hours. The clear solution which results is acidified to precipitate the product which is recrystallized from aqueous ethanol to obtain 14.7 g. of 3-chloro-4-butyrylbenzoic acid, M.P. 110–112° C.

Analysis for $C_{11}H_{11}ClO_3$.—Calculated: C, 58.29; H, 4.89; found: C, 58.21; H, 4.73.

Step C: *3-chloro-4-(2-piperidinomethylbutyryl)benzoic acid hydrochloride*.—A mixture of 2.3 g. (0.01 mole) of 3-chloro-4-butyrylbenzoic acid, 0.42 g. (0.014 mole) of paraformaldehyde, 1.3 g. (0.011 mole) of piperidine hydrochloride and 0.5 ml. of ethanolic hydrogen chloride is heated 1.5 hours on a steam bath. The resulting solid cake is triturated with 10 ml. of boiling isopropyl alcohol and the insoluble product collected. The 3-chloro-4-(2-piperidinomethylbutyryl)benzoic acid hydrochloride thus obtained weighs 1.9 g., M.P. 169.5–171.5° C.

Step D: *3-chloro-4-(2-methylenebutyryl)benzoic acid*.—A solution of 1.9 g. (0.005 mole) of 3-chloro-4-(2-piperidinomethylbutyryl)benzoic acid hydrochloride in 25 ml. of saturated sodium bicarbonate solution is heated two minutes on a steam bath. The solution is quickly cooled and acidified to precipitate the product which is then recrystallized from cyclohexane to obtain 0.5 g. of 3-chloro-4-(2-methylenebutyryl)benzoic acid, M.P. 104.5–107.0° C.

Analysis for $C_{12}H_{11}ClO_3$.—Calculated: C, 60.39; H, 4.65; found: C, 60.57; H, 4.97.

EXAMPLE 2

*3-chloro-4-methacryloylbenzoic acid*

Step A: *2-chloro-4-aminopropiophenone*.—m-Chloropropionanilide (172 g., 0.94 mole) is mixed with 504 g. (3.76 mole) of aluminum chloride and propionyl chloride (175 g., 1.88 mole) is then added to the mixture with stirring over a four-hour period. The mixture is stirred three hours while heating on a steam bath and then poured onto a mixture of ice and hydrochloric acid. m-Chloro-p-propionylpropionanilide separates and crystallizes. This product is collected and hydrolyzed by heating with 900 ml. of 6 N hydrochloric acid for 1.5 hours on the steam bath. The solution thus obtained is made basic with 40% sodium hydroxide solution. The resulting product is collected and recrystallized from isopropyl alcohol to obtain 77 g. of 2-chloro-4 aminopropiophenone, M.P. 97–101° C.

An analytical sample gives a melting point of 98–101° C.

*Analysis* for $C_9H_{10}ClNO$.—Calculated: C, 58.86; H, 5.49; N, 7.63; found: C, 58.76; H, 5.38; N, 7.55.

*Step B: 3-chloro-4-propionylbenzoic acid.*—By following the method described in Example 1, step B, but using 2-chloro-4-aminopropiophenone as the starting material in lieu of the 2-chloro-4-aminobutyrophenone recited therein, there is obtained 3-chloro-4-propionylbenzoic acid, M.P. 125.5–127.0° C.

*Analysis* for $C_{10}H_9ClO_3$.—Calculated: C, 56.48; H, 4.27; found: C, 56.33; H, 4.57.

*Step C: 3-chloro-4-(2-piperidinomethylpropionyl)benzoic acid hydrochloride.*—A mixture of 7.8 g. (0.0365 mole) of 3-chloro-4-propionylbenzoic acid, 1.5 g. (0.05 mole) of paraformaldehyde, 4.9 g. (0.04 mole) of piperidine hydrochloride and 1 ml. of ethanolic hydrogen chloride is heated 1.5 hours on a steam bath. The resulting solid cake is broken up and triturated with 60 ml. of boiling isopropyl alcohol. The insoluble 3-chloro-4-(2-piperidinomethylpropionyl)benzoic acid hydrochloride thus obtained is collected and weighs 7.2 g., M.P. 165–168° C.

*Step D: 3-chloro-4-methacryloylbenzoic acid.*—A solution of 3.5 g. (0.01 mole) of 3-chloro-4-(2-piperidinomethylpropionyl)benzoic acid hydrochloride in 35 ml. of saturated sodium bicarbonate solution is heated one minute on a steam bath. The solution is quickly cooled and acidified to precipitate the product which is then recrystallized from benzene to obtain 0.7 g. of 3-chloro-4-methacryloylbenzoic acid, M.P. 117.5–118.5° C.

*Analysis* for $C_{11}H_9ClO_3$.—Calculated: C, 58.81; H, 4.04; found: C, 59.05; H, 4.45.

EXAMPLE 3

4-methacryloylbenzoic acid

*Step A: 4-propionylbenzoic acid.*—By following the method described in Example 1, step B, but using 4-aminopropiophenone as the starting material in lieu of the 2-chloro-4-aminobutyrophenone recited therein, there is obtained 4-propionylbenzoic acid, M.P. 182.5–184° C.

*Analysis* for $C_{10}H_{10}O_3$.—Calculated: C, 67.40; H, 5.66; found: C, 67.86; H, 5.61.

*Step B: 4-[2-(dimethylaminomethyl)propionyl]benzoic acid hydrochloride.*—A mixture of 15.5 g. (0.087 mole) of 4-propionylbenzoic acid, 3.9 g. (0.13 mole) of paraformaldehyde, 8.2 g. (0.1 mole) of dimethylamine hydrochloride, and 1.0 ml. of ethanolic hydrogen chloride is heated 30 minutes at 120–130° C. The resulting solid cake is dissolved in a hot mixture of 200 ml. of ethanol and 8.0 ml. of water. The solution thus obtained is then chilled, whereupon the product crystallizes to yield 17.5 g. of 4-[2-(dimethylaminomethyl)propionyl]benzoic acid hydrochloride, M.P. 185–188° C.

*Step C: 4-methacryloylbenzoic acid.*—4-[2-(dimethylaminomethyl)propionyl]benzoic acid hydrochloride (17.5 g., 0.065 mole) is dissolved in 150 ml. of a saturated sodium bicarbonate solution and the solution is heated five minutes on a steam bath. The solution is then quickly cooled and acidified to precipitate the product which is recrystallized from aqueous isopropyl alcohol to yield 3.4 g. of 4-methacryloylbenzoic acid, M.P. 151–153° C.

*Analysis* for $C_{11}H_{10}O_3$.—Calculated: C, 69.46; H, 5.30; found: C, 69.07; H, 5.45.

EXAMPLE 4

3-methacryloyl-4-chlorobenzoic acid

*Step A: 2-chloro-5-nitropropiophenone.*—2-chloropropiophenone (84.5 g., 0.5 mole) is added to 300 cc. of fuming nitric acid (d. 1.4) at a temperature of 5 to 10° C. during 18 minutes. The mixture is allowed to stand at 0–5° C. for 30 minutes, poured into ice water and the solid product thus obtained is recrystallized from isopropyl alcohol to obtain 75 g. of 2-chloro-5-nitropropiophenone, M.P. 52–56° C.

A small sample product recrystallized for analysis from isopropyl alcohol gives a melting point of 54–56° C.

*Analysis* for $C_9H_8ClNO_3$.—Calculated: C, 50.60; H, 3.77; N, 6.56; found: C, 51.47; H, 4.01; N, 6.62.

*Step B: 2-chloro-5-aminopropiophenone.*—A solution of 25.9 g. (0.121 mole) of 2-chloro-5-nitropropiophenone in 60 cc. of acetic acid is added to 240 cc. of a 7.5 N hydrochloric acid solution in which is dissolved 100 g. of stannous chloride dihydrate. The solution is heated one hour on the steam bath. The solution is then made basic by addition of sodium hydroxide solution and the oily product thus obtained is taken up in ether. Evaporation of the ether leaves 2-chloro-5-aminopropiophenone as a yellow oil weighing 18.0 g. This material is used directly in the following step.

A small sample of the 2-chloro-5-aminopropiophenone distilled for analysis has a boiling point of 143–146° C./0.5 mm.

*Analysis* for $C_9H_{10}ClNO$.—Calculated: C, 58.86; H, 5.49; N, 7.63; found: C, 59.10; H, 5.58; N, 7.54.

*Step C: 3-propionyl-4-chlorobenzoic acid.*—By following the method described in Example 1, step B, but using 2-chloro-5-aminopropiophenone as the starting material in lieu of the 2-chloro-4-aminobutyrophenone recited therein, there is obtained 3-propionyl-4-chlorobenzoic acid, m.p. 147–149° C.

*Step C: 3-propionyl-4-chlorobenzoic acid.*—By following the method described in Example 1, step B, but using 2-chloro-5-aminopropiophenone as the starting material in lieu of the 2-chloro-4-aminobutylrophenone recited therein, there is obtained 3-propionyl-4-chlorobenzoic acid, M.P. 147–149° C.

*Analysis* for $C_{10}H_9ClO_3$.—Calculated: C, 56.48; H, 4.27; found: C, 56.79; H, 4.46.

*Step D: 3 - [2 - (dimethylaminomethyl)propionyl]-4-chlorobenzoic acid hydrochloride.*—A mixture of 2.1 g. (0.01 mole) of 3-propionyl-4-chlorobenzoic acid, 0.39 g. (0.13 mole) of paraformaldehyde, 0.9 g. (0.011 mole) of dimethylamine hydrochloride and 1.01 ml. of concentrated hydrochloric acid is heated two hours on a steam bath. The semisolid cake is triturated with 30 ml. boiling isopropyl alcohol and the insoluble product collected to obtain 1.25 g. of 3-[2-(dimethylaminomethyl -propionyl]-4-chlorobenzoic acid hydrochloride, M.P. 152–154° C.

*Step E: 3-methacryloyl-4-chlorobenzoic acid.*—Sodium bicarbonate (2.0 g.) is added to a solution of 3.4 g. (0.0126 mole) of 3 - [2 - (dimethylaminomethyl)propionyl]-4-chlorobenzoic acid hydrochloride in 35 ml. of water. The solution is heated six minutes on a steam bath, cooled and acidified to precipitate the product which is recrystallized from benzene to obtain 0.5 g. of 3-methacryloyl-4-chlorobenzoic acid, M.P. 150–152° C.

*Analysis* for $C_{11}H_9ClO_3$.—Calculated: C, 58.81; H, 4.04; found: C, 59.03; H, 4.22.

By substituting the appropriate alkanoyl halide and anilide reactants for the butyryl chloride and m-chloroacetanilide, respectively, of Example 1, step A, and appropriate secondary amine hydrochloride for the piperidine hydrochloride of Example 1, step C, and following substantially the procedure described in steps A–D of the said example, all of the (2-methylenealkanoyl)benzoic acid products (I) may be prepared. The following equation, wherein $n$ represents an integer having a value greater than 1, illustrates the reaction of Example 1, steps A–D, and the accompanying Table I depicts the alkanoyl halide, anilide and secondary amine hydrohalide reactants and (2-methylenealkanoyl)benzoic acid products (I) produced thereby:
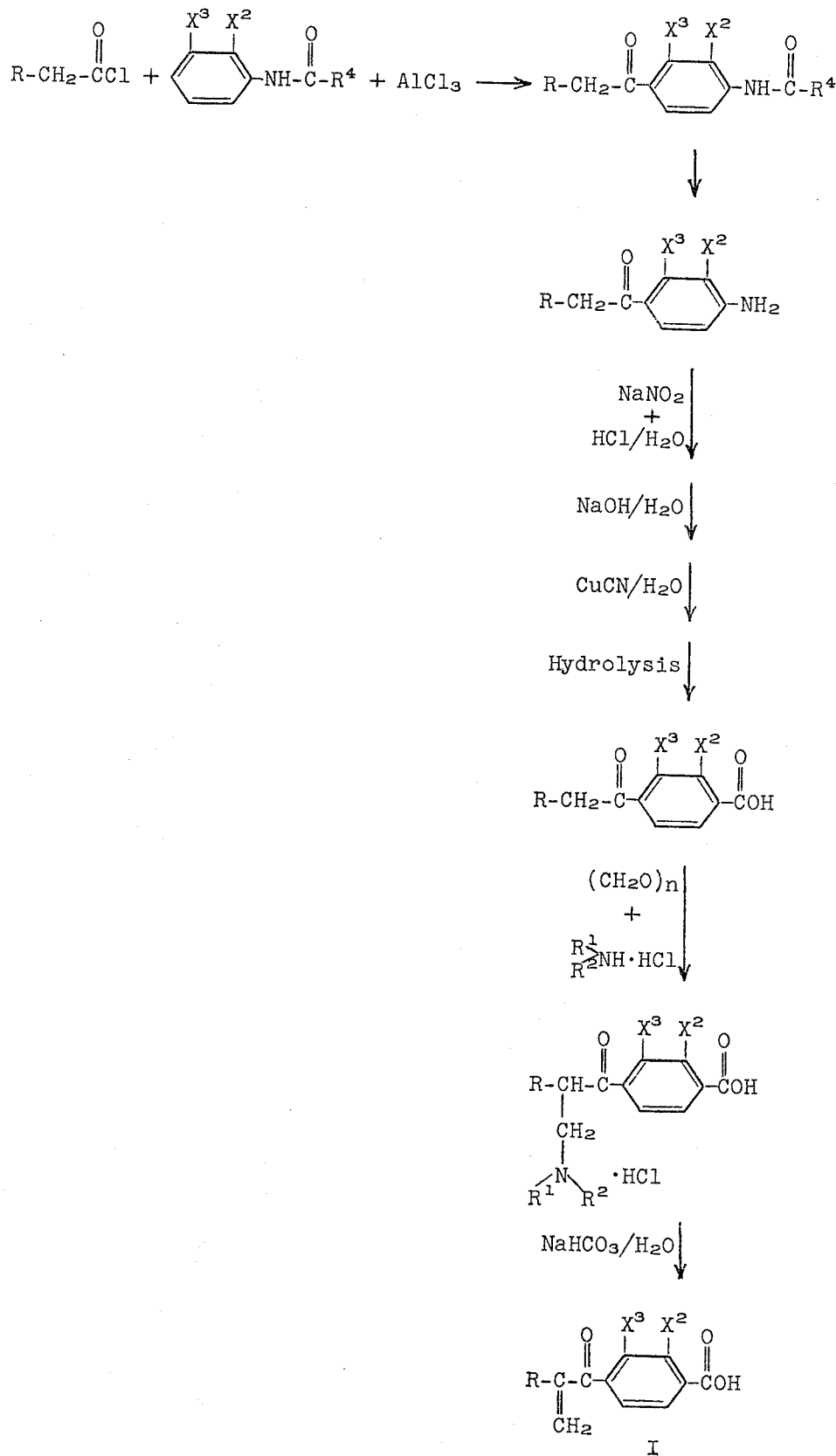

TABLE I

| Example | R | R¹ | R² | R⁴ | X² | X³ |
|---|---|---|---|---|---|---|
| 5 | $-C_2H_5$ | $-CH_3$ | $-CH_3$ | $-CH_3$ | Cl | Cl |
| 6 | $-C_2H_5$ | $-CH_3$ | $-CH_3$ | $-CH_3$ | $-CH_3$ | $-CH_3$ |
| 7 | $-CH(CH_3)_2$ | $-C_2H_5$ | $-C_2H_5$ | $-CH_3$ | H | Cl |
| 8 | $-CH(CH_3)_2$ | $-CH_2-CH_2-CH_2-CH_2-$ | | $-CH_3$ | Cl | Cl |
| 9 | $-C_2H_5$ | $-C_2H_5$ | $-C_2H_5$ | $-CH_3$ | $-CH=CH-CH=CH-$ | |
| 10 | $-C_2H_5$ | $-CH_3$ | $-CH_3$ | $-CH_3$ | Cl | Cl |
| 11 | $-C_2H_5$ | $-CH_3$ | $-CH_3$ | $-CH_3$ | $-CH_3$ | Cl |
| 12 | $-(CH_2)_4CH_3$ | $-CH_2-CH_2-CH_2-CH_2-$ | | $-C_2H_5$ | H | Cl |

It will be apparent from the foregoing description that the (2-methylenealkanoyl)benzoic acids of this invention constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:

1. A member selected from the group consisting of a compound of the formula:

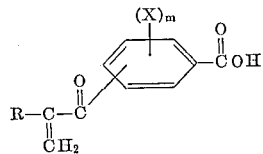

wherein R is lower alkyl; X is a member selected from the group consisting of hydrogen, halogen, lower alkyl and, taken together, two X radicals on adjacent carbon atoms of the benzene ring may be joined to form an hydrocarbylene chain selected from the group consisting of tetramethylene and 1,3-butadienylene; and *m* is an integer having a value of 1–2; and the non-toxic, pharmacologically acceptable acid addition salts thereof.

2. A compound of the formula:

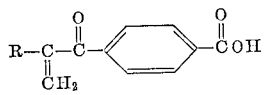

wherein R is lower alkyl.

3. A compound of the formula:

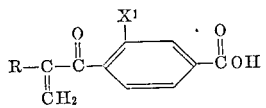

wherein R is lower alkyl and $X^1$ is halogen.

4. 3-chloro-4-(2-methylenebutyryl)benzoic acid.
5. 3-chloro-4-methacryloylbenzoic acid.
6. 4-methacryloylbenzoic acid.
7. 3-methacryloyl-4-chlorobenzoic acid.

References Cited

Adams et al.: "Organic Reactions," vol. I, John Wiley and Sons, Inc., N.Y., 1942, pp. 304–319. QD 251.07.

LORRAINE A. WEINBERGER, *Primary Examiner.*

THOMAS L. GALLOWAY, *Assistant Examiner.*